United States Patent
Kanaya et al.

(10) Patent No.: US 8,023,189 B2
(45) Date of Patent: Sep. 20, 2011

(54) RETARDATION COMPENSATION ELEMENT AND MANUFACTURING METHOD OF THE SAME

(75) Inventors: Mototaka Kanaya, Sano (JP); Shuji Akiya, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 584 days.

(21) Appl. No.: 12/105,048

(22) Filed: Apr. 17, 2008

(65) Prior Publication Data
US 2008/0259453 A1 Oct. 23, 2008

(30) Foreign Application Priority Data
Apr. 19, 2007 (JP) ................................. 2007-110142

(51) Int. Cl.
G02B 27/28 (2006.01)
C23C 14/32 (2006.01)
(52) U.S. Cl. ............. 359/490.01; 204/192.26; 264/1.34; 427/164
(58) Field of Classification Search .................. 359/483, 359/485, 501, 900; 204/192.26, 192.27, 204/192.28; 156/99; 264/1.34, 1.7; 427/162, 427/164
See application file for complete search history.

(56) References Cited

U.S. PATENT DOCUMENTS

| | | | | |
|---|---|---|---|---|
| 3,957,348 | A * | 5/1976 | Saeva | 349/98 |
| 5,350,498 | A * | 9/1994 | Smith et al. | 204/192.23 |
| 7,763,151 | B2 * | 7/2010 | Noguchi et al. | 204/192.29 |
| 7,864,276 | B2 * | 1/2011 | Iwamoto | 349/117 |
| 2005/0168662 | A1 | 8/2005 | Nakagawa | |
| 2007/0267057 | A1* | 11/2007 | Haluzak et al. | 136/255 |
| 2008/0198456 | A1* | 8/2008 | Sharp | 359/499 |
| 2008/0225211 | A1* | 9/2008 | Kume et al. | 349/96 |

FOREIGN PATENT DOCUMENTS
JP 2004-102200 A 4/2004
JP 2006-91388 A 4/2006
* cited by examiner Primary Examiner — Frank G Font
(74) Attorney, Agent, or Firm — Birch, Stewart, Kolasch & Birch, LLP

(57) ABSTRACT

Two types of layers are simultaneously formed on a substrate and another substrate under the same layer forming condition, the heights of which are equal to a half height of an intended retardation compensation layer. Physical properties of the respective two types of layers formed on the substrates are identical to each other, and if deviations are produced in retardation distribution characteristics for azimuth angles of incident light, these deviations are commonly provided in the respective two types of layers. When one substrate is superposed with the other substrate and these superposed substrates are integrated with each other in order to make a single sheet of retardation compensation element, after one of these substrates is rotated by an angle of 90 degrees with respect to the other substrate, these substrates are stuck to each other by an adhesive agent.

4 Claims, 8 Drawing Sheets

ND MANUFACTURING METHOD OF THE
RETARDATION COMPENSATION ELEMENT AND MANUFACTURING METHOD OF THE SAME

The present application is based upon and claims the benefit of priority from Japanese Patent Application No. JP2007-110142 filed on Apr. 19 of 2007, the entire disclosure of which is incorporated herein by reference.

BACKGROUND OF THE INVENTION

1. Field of the Invention

The present invention is related to a retardation compensation element which is used in combination with a liquid crystal display panel, and a manufacturing method thereof.

2. Description of Related Art

A large number of liquid crystal display panels have been employed in direct viewing type display apparatuses of television receivers and of various appliances. Also, liquid crystal display panels have been employed as image display devices of liquid crystal projectors. Liquid crystal display panels have been constructed in such a manner that a large number of liquid crystal cells are arrayed in a pattern in correspondence with pixel arrays. Various types of liquid crystal display panels are known, depending upon operating modes of liquid crystal molecules sealed in liquid crystal cells, for instance, TN (Twisted Nematic) type LCD panels; VAN (Vertical Alignment Nematic) type LCD panels; IPS (In-Plane Switching) type LCD panes; OCB (Optically Compensatory Bend) type LCD panels, and the like.

As liquid crystal display panels employed in liquid crystal projectors, since such liquid crystal display panels having superior light-shielding characteristics have been properly employed in order to increase contrasts of images on display screens, there is a trend that, for instance, VAN type liquid crystal display panels have been largely employed. In the VAN type liquid crystal display panel, the most of rod-shaped liquid crystal molecules within a liquid crystal layer are orientated substantially perpendicular to substrates under such a no voltage applying condition that a voltage is not applied between the substrates sandwiching the liquid crystal layer, and a better light-shielding characteristic and a higher contrast can be achieved by being combined with one pair of polarizing plates which are arranged in a crossed Nicols arrangement.

On the other hand, as general drawbacks caused by liquid crystal display panels, it is known that viewing angles thereof are narrow. For instance, In the case where the VAN type liquid crystal display panel is brought into the no voltage applying condition so that liquid crystal molecules are vertically orientated, light vertically entering the liquid crystal layer can be sufficiently shielded, but light obliquely entering the liquid crystal molecules is birefringently refracted in response to incident angles thereof, and thus, generally speaking, linear polarization is transformed to elliptical polarization. As a result, a portion of polarized light components passes through a polarizing plate arranged in the crossed Nicols arrangement on the side of a light-emitting plane and then gives an influence on a black level on the display screen becoming bright, so that this polarized light component may lower the contrast. Also, when the crystal liquid molecules within the liquid crystal layer constitute either horizontal orientation or intermediate orientation, it is not possible to avoid that a quality of a displayed image is lowered, depending upon a difference in birefringence caused by angles of light entering the liquid crystal layer.

The above-described drawbacks of the liquid crystal display panels can be improved by employing a retardation compensation element disclosed in e.g., JP-A-2006-91388 and JP-A-2004-102200. Due to the birefringent characteristic of the liquid crystal layer, the liquid crystal layer is operated as a so-called "positive retarder" by which a phase of an ordinary light component of light entering the liquid crystal layer precedes that of an extraordinary light component thereof. However, the retardation compensation element is operated as a so-called "negative retarder" by which the phase of the ordinary light component of the entered light is delayed with respect to the extraordinary light component thereof. As a consequence, since the retardation compensation element is combined with the liquid crystal display panel, the birefringent characteristics thereof may be offset with each other, so that the reduction of the contrast may be suppressed.

As described in JP-A-2006-91388 and JP-A-2004-102200, since high luminance lamps are employed as light sources in the liquid crystal projectors, sufficiently high heat resisting properties are required for the retardation compensation elements. As described in JPA-2006-91388, if a crystal plate of an optical anisotropic material is employed in the retardation compensation element, then a retardation compensation element having a superior heat resisting property can be obtained. However, such a crystalline plate itself is high cost; when the crystal plate is processed, cutting of crystal planes and dimensional precision must he strictly managed, and assembling and adjusting works of the retardation compensation element are cumbersome. In this regard, the retardation compensation element described in JP-A-2004-102200 has the following advantages: That is the retardation compensation element can be constructed of multiple layers and can be manufactured by stacking transparent thin layers (made of inorganic material); the retardation compensation element can have superior heat resisting property and superior durability and further superior mass production applicability; and the retardation compensation element can be provided at low cost.

The retardation compensation element described in JP-A-2004-102200 includes multiple layers manufactured by alternately stacking two types of thin layers on each other, the two types of thin layers having different refractive indices from each other and having such thicknesses that optical interference does not occur when visible light enters the layers, and is operated as a negative uniaxial c-plate in the crystal optics. As the two types of thin layers, various thin layers below may be employed, namely, as thin layers having high refractive indices, $TiO_2$, $ZrO_2$, $Nb_2O_5$, and the like may be employed, whereas as thin layers having low refractive indices, $SiO_2$, $MgF_2$, $CaF_2$, and the like may be employed. Also, these thin layers may be manufactured by employing multilayer forming methods such as a vapor deposition method, a sputtering processor, and furthermore, an ion plating method. These thin layers may be simply manufactured by employing, for example, a sputtering apparatus shown in FIG. 7.

FIG. 7 conceptually shows a sputtering apparatus for manufacturing such a retardation compensation element in which two types of thin layers made of inorganic materials are alternately stacked. In the sputtering apparatus, an exhaust tube 3, a nozzle 4 for conducting discharge gas, and nozzles 5, 5 for conducting reaction gas is communicated with a vacuum chamber 2. Inside the vacuum chamber 2, a drum 6 is rotatably assembled around a vertical supporting shaft, and transparent substrates 7 on which thin layers are formed are supported by an outer circumferential plane of the drum 6. En this figure, such a condition is illustrated that 5 sheets of substrates 7a to 7e are arranged in a longitudinal direction on only one plane of flat outer circumferential planes of the drum 6 having an octagonal cylindrical shape, but when thin layers are actually manufactured, the substrates 7 may be supported on all of the octagonal planes of the drum 6 in a similar manner. Also, if the drum 6 has any other structures capable of supporting the substrates 7a to 7e equidistant from the rotation center of the drum 6, then the shape of the drum 6 may be properly selected from a hexagonal cylindrical shape, a cylindrical shape, and the like. Moreover, a total number of substrates 7 which are supported on the outer circumferential planes of the drum 6 may be properly increased, or decreased in correspondence with sizes of substrates and sizes of drums.

The respective substrates 7a to 7e are fixed on the substrate holder 8 freely rotatable over the outer circumferential planes of the drum 6, and when the substrate holder 8 is rotated, the respective substrates 7a to 7e are rotated by an angle of 90 degrees around the normal of the surface of the substrate 7. The rotation direction may be selected from any of the clockwise direction and the counterclockwise direction. Two target materials 9 and 10 are provided within the vacuum chamber 2 in such a manner that these target materials 9 and 10 are located opposite to the respective substrates 7a to 7e. Since these target materials 9 and 10 include thin-layer materials which are alternately stacked on the surfaces of the substrates 7a to 7e. Nb (niobium) and Si (silicon) is employed as one example. Then, the drum 6 is rotated at a constant speed and a chemical reactive sputtering process with these target materials 9 and 10 is carried out in an oxygen gas atmosphere, so that multiple layers on the substrates 7a to 7e, in which an $Nb_2O_5$ layer having a high refractive index (n=2.38) and an $SiO_2$ layer having a low refractive index (n=1.48) are alternately stacked, can be obtained.

If the layer having the high refractive index and the layer having the low refractive index are stacked on each other in such a manner that physical layer thicknesses thereof are made thin, for instance, approximately 10 to 20 nm, then a retardation compensation element (negative retarder) having a birefringence "$\Delta n$" may be obtained. A magnitude of the birefringence "$\Delta n$" is determined based upon both a difference between the refractive indices of two types of thin layers and a ratio of the physical layer thicknesses of the thin layers; and retardation "$d\Delta n$" is determined based upon a product calculated by this birefringence "$\Delta n$" and an entire layer thickness "d" of the multilayer layer. As a consequence, thin layers are designed in correspondence with a value of positive retardation "$d\Delta n$" which is produced by a liquid crystal layer of a liquid crystal display panel to which the designed thin layers are applied, and thus, both birefringence "$\Delta n$" and an entire layer thickness "d" are determined. In order to simplify layer forming steps, it is advantageous to alternately stack two types of thin layers on each other. Alternatively, even if three or more thin layers having different refractive indices from one another are used in combination, an effect of a retardation compensation, similar to that of the two types of thin layers, may be achieved.

FIG. 8 shows the thus-obtained retardation compensation element 20. That is, a retardation compensation layer 21 of a multiple layer in which the high refractive index layer "L1" and the low refractive index layer "L2" are alternately stacked is formed on a front surface of a substrate 7, and this retardation compensation layer 21 is operated as the negative retarder. An antireflection layer may he alternatively provided on a rear plane of the substrate 7, a boundary plane between the substrate 7 and the retardation compensation layer 21, or a front plane of the retardation compensation layer 21. As represented in FIG. 10, this retardation compensation element 20 does not have a birefringent characteristic with respect to light "P1" which vertically enters the retardation compensation layer 21. As a consequence, no phase difference is produced in light emitted from the retardation compensation element 20. This is due to the fact that, for instance, a VAN type liquid crystal layer does not have the birefringent characteristic with respect to light which vertically enters this VAN type liquid crystal layer under no voltage applying condition. However, with respect to light "P2" which enters the retardation compensation element 20 at an incident angle "θ", even if most of the liquid crystal molecules constitute vertical orientation attitudes under no voltage applying condition, the liquid crystal molecules develop a birefringent characteristic with respect to this oblique incident light "P2", and thus, may produce positive retardation "$d\Delta n$" in response to an optical path length which is determined based upon the incident angle "θ" As a consequence, the retardation compensation element 20 generates negative retardation "$d\Delta n$" in response to the incident angle "θ" with respect to the light P2 having the incident angle "θ" so as to compensate the positive retardation occurred in the liquid crystal layer.

FIG. 11 shows an occurrence distribution characteristic of the negative retardation "$d\Delta n$" by way of a conoscope type graphic representation, the negative retardation "$d\Delta n$" being produced by the retardation compensation element 20 manufactured by the sputtering apparatus shown in FIG. 7 with respect to oblique incident light whose incident angle "θ" is approximately 30 degrees. The value of the negative retardation "$d\Delta n$" is equivalent to a length of a radius measured from a center of the graph. As indicated by a characteristic line "Q1", if the value of the negative retardation "$d\Delta n$" is substantially constant irrespective of an azimuth angle (being equivalent to such an angle that light P2 is fixed along constant direction and substrate 7 is rotated around normal line), there is no problem. However, as represented by another characteristic line "Q2", there are some possibilities that such a retardation compensation element 20 whose retardation value "$d\Delta n$" is varied in response to the azimuth angles may be manufactured. In such a retardation compensation element 20, the above-described fact implies that the positive retardation "$d\Delta n$" occurred in the liquid crystal layer cannot be compensated, depending upon the direction along which the liquid crystal display panel is observed, and thus, the larger the value of the incident angle "θ" becomes, the greater the degree of the influence thereof is increased. Moreover, the following could be confirmed which may impede that a retardation compensation effect in higher precision is achieved. That is, the retardation compensation element having such a trend as indicated by the characteristic line Q2 with respect to the light P2 may produce negative retardation "$d\Delta n$" which exceeds 1 nm even with respect to the vertically entered light P1.

This is specifically caused by a retardation compensation element for obtaining a retardation compensation effect by alternately stacking thin layers having two refractive indices (namely, high and low refractive indexes). It is conceivable that the above problem may be caused by a small difference contained in layer forming conditions of retardation compensation layers in which layer thicknesses of the respective thin layers are made sufficiently thin, and furthermore, entire layer numbers reach several tens of layers, or one hundred and several tens of layers to several hundreds of layers. For example, when a general-purpose optical interference thin layer is formed by employing the sputtering apparatus shown in FIG. 7, as to both a thin layer formed on the substrate 7a supported on a first stage of the drum 6 and another thin layer formed on the substrate 7c supported on a third stage of the drum 6, although optical characteristics of these thin layers are not completely coincident with each other, practically speaking, there is substantially no possibility that this difference of these optical characteristics may cause a problem. In contrast to the optical interference thin layer, in the retardation compensation layer, a large number of the individual thin layers are stacked, changes in physical properties caused by a slight difference contained in the layer forming conditions are accumulated and emphasized. As a result, as can be seen from the characteristic line Q2 of FIG. 11, the retardation distribution characteristic related to the azimuth angles becomes non-uniform, so that superior retardation compensation effects can be hardly obtained.

SUMMARY OF THE INVENTION

An object of an illustrative, non-limiting embodiment of the present invention is to improve an effect of phase difference compensation produced by a retardation compensation layer in which at least two types of thin layers having different refractive indices from each other and thin thicknesses so as not to produce interference in visible light are stacked in large number. Also, another object is to provide a manufacturing method capable of manufacturing a retardation compensation element in a higher efficiency, in which such a retardation compensation layer is formed.

Since the layer forming conditions of the individual thin layers are not always constant when a retardation compensation layer of the above-described multilayer structure is manufactured, the present inventors have paid attention to such a fact that the slight difference of these layer forming conditions may change the physical properties of the individual thin layers and the changes in the physical properties of the respective thin layers in connection with the formation of the multilayer structure are accumulated and emphasized so that a retardation compensation effect thereof may be largely varied. In view of this fact, a retardation compensation element according to an aspect of the present invention is characterized in that the retardation compensation layer is subdivided into a multilayer of a first element and another multilayer layer of a second element, and the first element is combined with the second element under such a relationship that deviations of the retardation compensation effects produced by the respective multilayer layers are complemented with each other.

For instance, as to a retardation compensation layer as a whole, when a retardation distribution characteristic with respect to azimuth angles of light entering the retardation compensation layer represents such a deviation as a characteristic line "Q2" indicated in FIG. 11, multiple layers formed by stacking thin layers until layer thicknesses thereof become equal to a half layer thickness of the retardation compensation layer can reduce values of the retardation by ½, but deviation trends related to the azimuth angles indicate the same trends. As a consequence, the first element and second element are prepared in which multiple layers are formed on the respective substrates, whose retardation distribution characteristics with respect to the azimuth angles represent the same trends, and these first and second elements are integrated with each other so that one of these first and second elements is rotated by an angle of 90 degrees around the normal line of the element and the rotated element is integrated with the other element so as to constitute a retardation compensation element.

When the first element is integrated with the second element, the respective substrates may be joined with each other. Alternatively, the multilayer structure stacked on the respective substrates may be joined with each other. In the case that the retardation compensation element of the present invention is employed in a liquid crystal projector, in order to avoid that light emitted from a high luminance light source is reflected on this retardation compensation element, so that a so-called "ghost phenomenon" may occur, it is preferable to provide antireflection layers at proper positions of boundary planes between the substrates and the multilayer structures, boundary planes between the substrates and air, and also, boundary planes between the multilayer structures and air. Since the antireflection layers can be manufactured by employing the same thin layer materials as those of the thin layers for constructing the retardation compensation layers, there is no possibility that the steps for manufacturing the retardation compensation element become complex.

Moreover, in accordance with the retardation compensation element manufacturing method of the present invention, a total layer number of the thin layers stacked on the substrates within a vacuum chamber, or an entire layer thickness of the stacked thin layers may be substantially equal to a half layer thickness of an intended retardation compensation layer of, so that a time required for forming the thin layers can be largely reduced. Thereafter, one pair of the substrates taken out from the vacuum chamber, on which the multilayer structure are formed, may be combined with each other in such a manner that deviations of retardation compensation effects may be corrected in a complementary style, and may be joined with each other. Also, in a first step, in such a case that plural pieces of the substrates are supported on a drum rotated within the vacuum chamber, and while the drum is rotated, thin layers are sequentially stacked on these substrates, the following manufacturing method can have an advantage: That is, one pair of such substrates held on the same circumference of the drum are combined with each other so as to manufacture a single retardation compensation element.

BRIEF DESCRIPTION OF THE DRAWINGS

The features of the invention will appear more fully upon consideration of the exemplary embodiment of the invention, which are schematically set forth in the drawings, in which.

Figure 1:
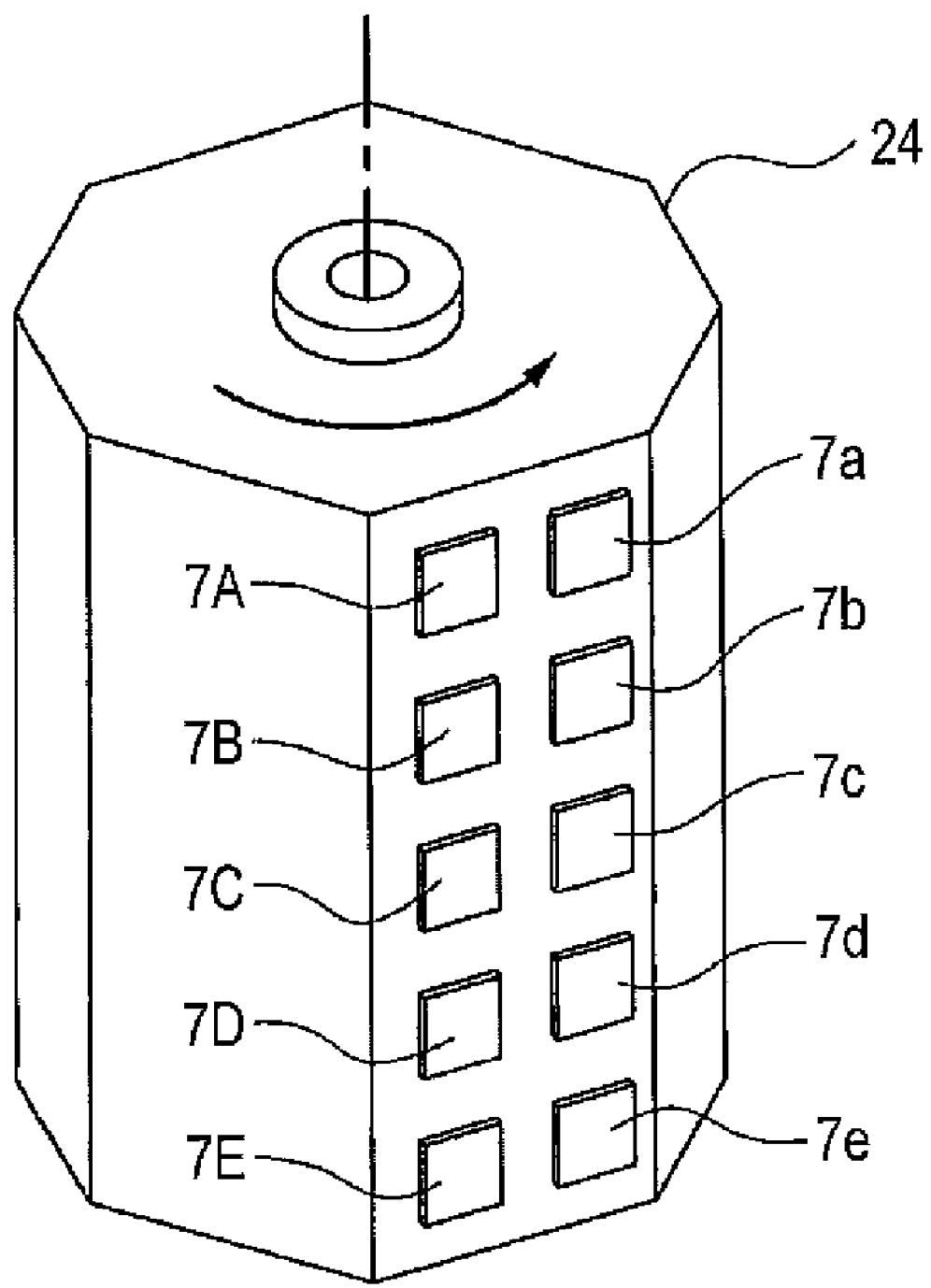
FIG. 1 is an outer view of a drum employed when a retardation compensation element according to an exemplary embodiment of the present invention is manufactured by performing a sputtering process.

2: vacuum chamber,
6, 24: drum,
7, 7A to 7E, 7a to 7e: substrate,
9, 10: target material,
20, 30, 31, 35: retardation compensation element,
21: retardation compensation layer,
21a: first half layer,
21b: second half layer, and
38: mark.

DETAILED DESCRIPTION OF THE EXEMPLARY EMBODIMENTS

Although the invention will be described below with reference to exemplary embodiments thereof, the following exemplary embodiments and modifications do not restrict the invention.

According to an exemplary embodiment of the present invention, the retardation compensation element operable as the negative retarder under better condition can be manufactured in a simpler method and a higher efficient manner. Also, in accordance with the retardation compensation element according to an exemplary embodiment of the present invention, such a imperfect retardation compensation effect with respect to the oblique incident light can be preferably improved, which may easily occur in the retardation compensation element having the multilayer structure in the background art, and, at the same time, the occurrence of the retardation with respect to the vertically entered light can be suppressed to such a retardation value smaller than, or equal to 1 nm.

Prior to a description of a retardation compensation element according to an exemplary embodiment of the present invention, firstly, a test sample manufactured by the sputtering apparatus of FIG. 7 will now be described. Layer forming steps of the test sample are similar to general-purpose sputtering steps. First of all, an exhausting operation of the vacuum chamber 2 is carried out. When the exhausting operation is carried out until the vacuum chamber 2 reaches a vacuum degree, argon gas is conducted from the conducting port nozzle 4 of the discharge gas, and, since the exhausting operation is performed in combination with this conducting operation of the argon gas, the interior of the vacuum chamber 2 is filled with the argon gas at the defined gas pressure. When a voltage is applied between the target materials 9 and 10, plasma of the argon gas is generated between the drum 6 and the target materials 9 and 10.

Under the plasma generation condition, oxygen gas is conducted from the conducting nozzles 5, 5 for the reaction gas at a gas pressure, so that the present plasma gas status is brought into such a condition that plasma of the oxygen gas is mixed within the plasma of the argon gas. When the drum 6 is rotated at a constant speed, a layer forming operation by a sputtering process is carried out and the substrates 7a to 7e pass through such sputtering areas which are located facing to the target materials 9 and 10. Both Nb particles and Si particles which are sputtered from the respective target materials 9 and 10 are oxidized within the oxygen atmosphere, and then, these oxidized particles become $Nb_2O_5$ and $SiO_2$, which are sequentially deposited on the substrates 7a to 7e. As a result, high refractive index layers made of the thin layer of $Nb_2O_5$ and low refractive index layers made of the thin layer of $SiO_2$ are alternately formed on the relevant substrates 7a to 7e. In order to control layer thicknesses of the individual thin layers, the rotation speed of the drum 6, the discharge voltage and electric power may be controlled. Moreover, shutters may be provided between the drum 6 and the respective target materials 9 and 10, and opening/closing times of these shutters may be controlled. In the case that the shutters are employed, when the substrates 7a to 7e is transported to the sputtering areas, the rotation of the drum 6 is stopped, and under this drum stopping condition, opening/closing operations of the shutters may be controlled. As a result, high refractive index layers having arbitrary layer thicknesses and low refractive index layers having arbitrary layer thicknesses may be alternately stacked on the relevant substrates 7a to 7e.

Various materials may be employed as the target materials 9 and 10 according to magnitudes of retardation "dΔn" produced by liquid crystal layers. For instance, oxide layers such as a $TiO_2$ layer, a $ZrO_2$ layer, a $CeO_2$ layer, an $SnO_2$ layer, and a $Ta_2O_5$ layer may be suitably employed as thin layers having high refractive indices, since these oxide layers have strong layer strengths and optical absorptions thereof are low. Also, as oxide layers which may be employed so as to form thin layers having low refractive indices, there are an $Al_2O_3$ layer, and an MgO layer, In the case that these oxide layers are formed, as previously explained, the oxygen gas is conducted to the sputtering areas, and particles of these oxide layers are oxidized and these oxide layers are formed. In addition, after a sputtering process is carried out from the target materials 9 and 10 without conducting the oxygen gas to the sputtering areas, a substrate may pass through the oxidizing areas filled with the oxygen gas so as to form the oxide layers before a thin layer of a next layer is formed on the sputtered thin layer.

Figure 8:
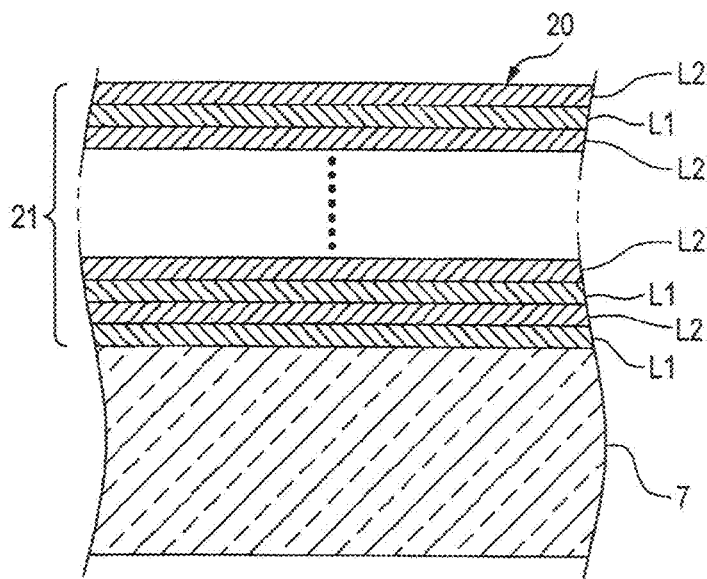
FIG. 8 is a diagram for schematically indicating a multilayer structure of a comparison sample.
Figure 9:
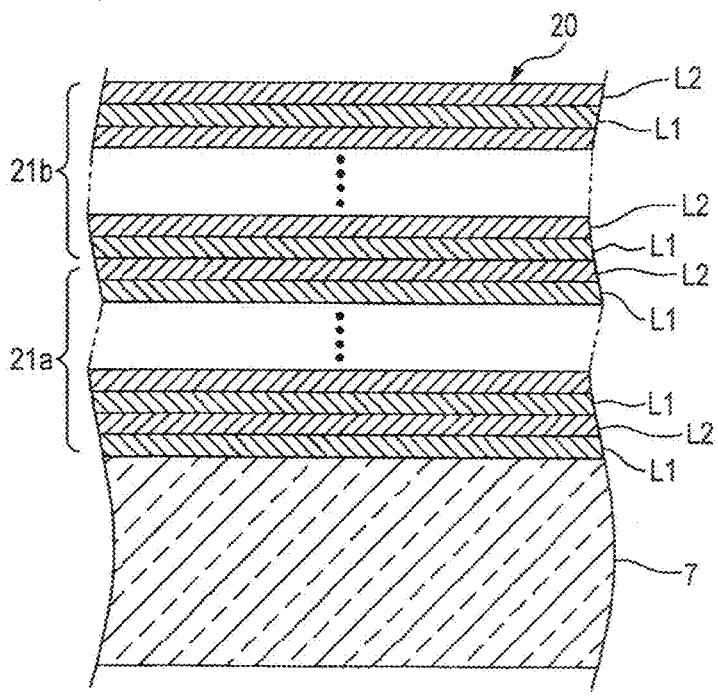
FIG. 9 is a diagram for schematically indicating a multilayer structure of a test sample.
Figure 10:
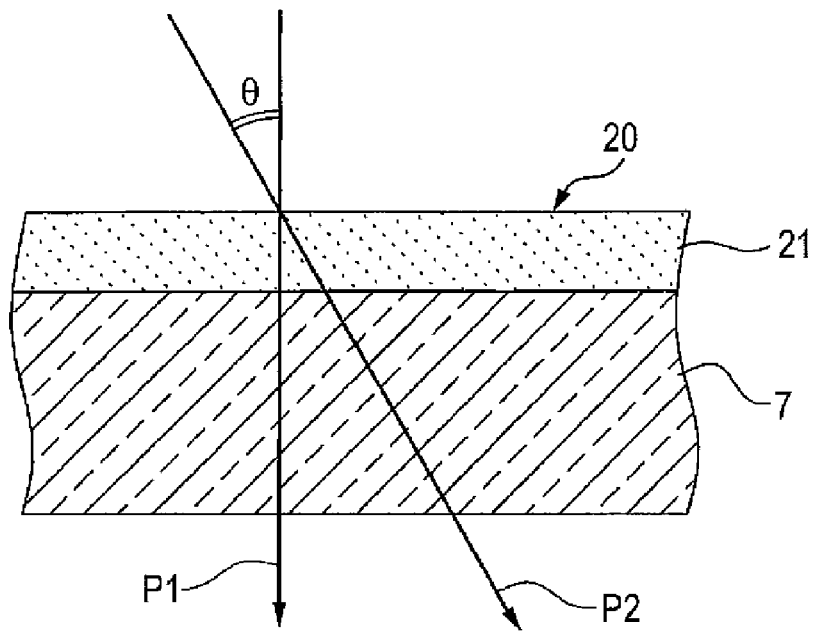
FIG. 10 is an explanatory diagram for explaining light entering a retardation compensation element.
Figure 11:
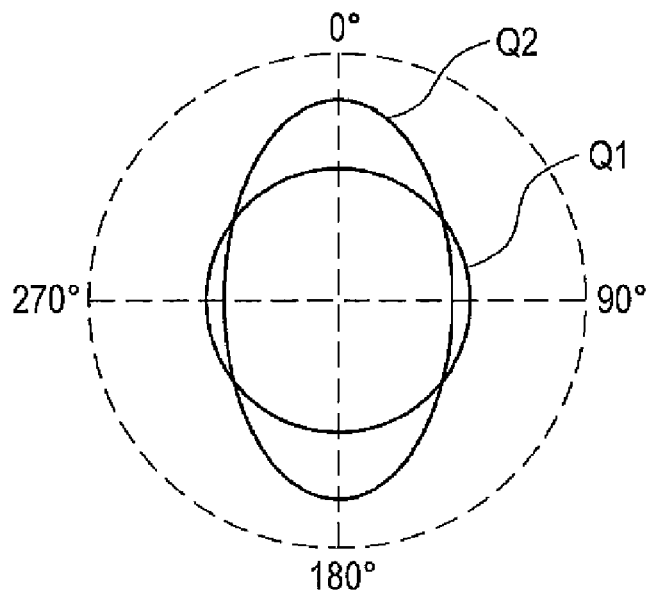
FIG. 11 is a graph for schematically representing a retardation distribution characteristic with respect to azimuth angles of incident light.

In the normal layer forming operation, the substrates 7a to 7e supported by the first stage to the fifth stage of the drum 6 are maintained at an attitude, all of layer forming operations as to the retardation compensation layer 21 are carried out, resulting in a comparison sample. In contrast to the comparison sample, in the test sample, at a time instant when the thin layers whose height is equal to a half layer of the retardation compensation layer 21 is formed on the respective substrates 7a to 7e which are supported at the same position on the drum 6, the substrate holder 8 is rotated by an angle of 90 degrees so as to rotate the respective substrates 7a to 7e around the normal line of the substrate. As a consequence, although the structures of the multiple layers as the entire retardation compensation layer 21 are completely identical to each other, with respect to the multiple layers of a first half layer thereof and the multiple layers of a second half layer thereof, deposition directions of the thin layers and supplying directions of the oxygen gas are different from each other with respect to the surfaces of the respective substrates 7a to 7e. Accordingly, the layer forming conditions for at least these points (namely, deposition directions and supplying directions) are different from each other. FIG. 9 conceptually shows structures of multiple layers of the test sample. Similar to the entire retardation compensation layer 21 of the comparison sample shown in FIG. 8, the entire retardation compensation layer 21 of the test sample has such a multilayer structure that high refractive index layers "L1" and low refractive index layers "L2" is alternately stacked. However, since the layer forming conditions before and after the substrates 7a to 7e are rotated are different from each other, for the sake of convenient explanations, the retardation compensation layer 21 is indicated as a first half layer 21a and a second half layer 21b.

The multilayer structures of the retardation compensation layers 21 formed in these comparison sample and test sample are represented in the table 1 below. With respect to each of the retardation compensation layers 21, an $Nb_2O_2$ layer having a physical layer thickness of 15 nm as the high refractive index layer "L1", and an $SiO_2$ layer having a physical layer thickness of 15 nm as the low refractive index layer "L2" are alternately and repeatedly stacked so as to construct such a multilayer structure made of 172 layers in total, and a total layer thickness thereof becomes 2580 nm. All of these 172 layers employed in the comparison sample were formed by performing the series of sputtering steps, whereas among all of these 172 layers employed in the test sample, at the time instant when the first half thin layer 21a was formed up to the first-half 86 layers, the substrates 7a to 7e were rotated by the angle of 90 degrees around the normal thereof, and thereafter, the second half thin layer 21b made of the remaining 86 layers was formed, so that the retardation compensation layer 21 was manufactured.

TABLE 1

| Layer NO. | Thin layer | Refractive index | Physical layer thickness (nm) |
|---|---|---|---|
|  | Air | 1 |  |
| 172 | $SiO_2$ | 1.4794 | 15.0 |
| 171 | $Nb_2O_5$ | 2.3796 | 15.0 |
| 170 | $SiO_2$ | 1.4794 | 15.0 |
| ... | ... | ... | ... |
| 90 | $SiO_2$ | 1.4794 | 15.0 |
| 89 | $Nb_2O_5$ | 2.3796 | 15.0 |
| 88 | $SiO_2$ | 1.4794 | 15.0 |

TABLE 1-continued

| Layer NO. | Thin layer | Refractive index | Physical layer thickness (nm) |
|---|---|---|---|
| 87 | $Nb_2O_5$ | 2.3796 | 15.0 |
| 86 | $SiO_2$ | 1.4794 | 15.0 |
| 85 | $Nb_2O_5$ | 2.3796 | 15.0 |
| 84 | $SiO_2$ | 1.4794 | 15.0 |
| 83 | $Nb_2O_5$ | 2.3796 | 15.0 |
| 82 | $SiO_2$ | 1.4794 | 15.0 |
| ... | ... | ... | ... |
| 7 | $Nb_2O_5$ | 2.3796 | 15.0 |
| 6 | $SiO_2$ | 1.4794 | 15.0 |
| 5 | $Nb_2O_5$ | 2.3796 | 15.0 |
| 4 | $SiO_2$ | 1.4794 | 15.0 |
| 3 | $Nb_2O_5$ | 2.3796 | 15.0 |
| 2 | $SiO_2$ | 1.4794 | 15.0 |
| 1 | $Nb_2O_5$ | 2.3796 | 15.0 |
|  | Substrate (glass) | 1.5208 |  |

The physical layer thicknesses as to the antireflection layers 31 and 32, and the retardation compensation layer 30 are not equal to such layer thickness values which were actually analyzed and measured with respect to the sample obtained after the layer forming process is performed, but the layer thicknesses are design values at the time of the layer forming process, namely correspond to such predicted layer thicknesses obtained by setting the layer forming conditions such as the rotation speeds of the drum 6, the opening/closing times of the shutters, and the discharge voltages and electric power applied to the target materials 9 and 10. The physical layer thicknesses may be properly made coincident with such measured layer thicknesses in the case that a layer thickness measuring operation is carried out while at least the layer forming operations are performed. Also, the refractive indices of the respective thin layers are similarly equal to such predicted values similarly confirmed by executing preceding layer forming experiments.

TABLE 2

Retardation (nm) of incident angle (θ) of 30° (λ = 550 nm)

|  |  | Comparison sample |  |  |  |  | Test sample |  |  |  |  |
|---|---|---|---|---|---|---|---|---|---|---|---|
|  |  | (1) | (2) | (3) | (4) | (5) | (1) | (2) | (3) | (4) | (5) |
| Azimuth angle | 0° | 37.25 | 35.18 | 34.92 | 35.63 | 37.47 | 35.27 | 34.82 | 35.03 | 35.11 | 35.47 |
|  | 30° | 36.44 | 35.16 | 35.08 | 35.60 | 37.05 | 35.40 | 34.85 | 34.97 | 35.12 | 35.51 |
|  | 60° | 34.56 | 35.05 | 35.31 | 35.25 | 34.47 | 35.55 | 34.97 | 35.30 | 35.43 | 35.60 |
|  | 90° | 33.83 | 34.93 | 35.45 | 35.28 | 33.95 | 35.60 | 34.99 | 35.19 | 35.55 | 35.70 |
|  | 120° | 34.38 | 34.91 | 35.27 | 35.39 | 34.42 | 35.59 | 34.87 | 34.83 | 35.50 | 35.70 |
|  | 150° | 36.49 | 35.11 | 35.12 | 35.58 | 36.85 | 35.41 | 34.84 | 34.90 | 35.22 | 35.68 |
|  | 180° | 37.33 | 35.23 | 34.97 | 35.63 | 37.51 | 35.26 | 34.80 | 34.89 | 35.06 | 35.60 |
|  | 210° | 36.50 | 35.18 | 35.05 | 35.56 | 36.74 | 35.32 | 34.82 | 34.97 | 35.24 | 35.60 |
|  | 240° | 34.40 | 34.88 | 35.37 | 35.45 | 34.76 | 35.45 | 34.86 | 35.12 | 35.40 | 35.74 |
|  | 270° | 33.68 | 34.79 | 35.38 | 35.29 | 34.10 | 35.50 | 34.98 | 35.08 | 35.51 | 35.76 |
|  | 300° | 34.55 | 34.91 | 35.31 | 35.29 | 34.75 | 35.54 | 34.94 | 35.11 | 35.50 | 35.73 |
|  | 330° | 36.37 | 35.06 | 35.14 | 35.54 | 36.81 | 35.26 | 34.77 | 35.01 | 35.26 | 35.60 |
| MAX |  | 37.33 | 35.23 | 35.45 | 35.63 | 37.51 | 35.60 | 34.99 | 35.30 | 35.55 | 35.76 |
| MIN |  | 33.68 | 34.79 | 34.92 | 35.25 | 33.95 | 35.26 | 34.77 | 34.83 | 35.06 | 35.47 |
| MAX − MIN |  | 3.64 | 0.44 | 0.53 | 0.38 | 3.56 | 0.35 | 0.22 | 0.48 | 0.49 | 0.29 |
| Average |  | 35.48 | 35.03 | 35.20 | 35.46 | 35.74 | 35.43 | 34.87 | 35.03 | 35.33 | 35.64 |
| σ |  | 1.36 | 0.14 | 0.17 | 0.15 | 1.43 | 0.13 | 0.08 | 0.14 | 0.18 | 0.09 |

The table 2 indicates actually measured values of retardation "dΔn" when light having a wavelength of 550 nm was entered at an incident angle of 30 degrees with respect to each of the comparison sample and the test sample. The retardation measurements were carried out while an azimuth angle was changed in a stepwise manner of 30 degrees. Reference numerals (1) to (5) shown in the table 2 denote sample numbers which correspond to the positions of the substrates 7a to 7e on the drum 6. In a general-purpose optical interference thin layer, even when a similar layer forming process is carried out by arranging the substrates 7a to 7e on the drum 6 along the longitudinal direction, there is substantially no specific difference, depending upon the positions of the substrates 7a to 7e. In contrast to this general-purpose optical interference thin layer, as especially conspicuously seen from the sample numbers (1) and (5) in the comparison sample, it can be revealed that, as to the retardation compensation layer formed on the substrate 7a positioned at the uppermost stage of the drum 6 and the retardation compensation layer formed on the substrate 7e positioned at the lowermost stage thereof, the values of the retardation "dΔn" are largely varied, depending upon the azimuth angles.

Figure 12:
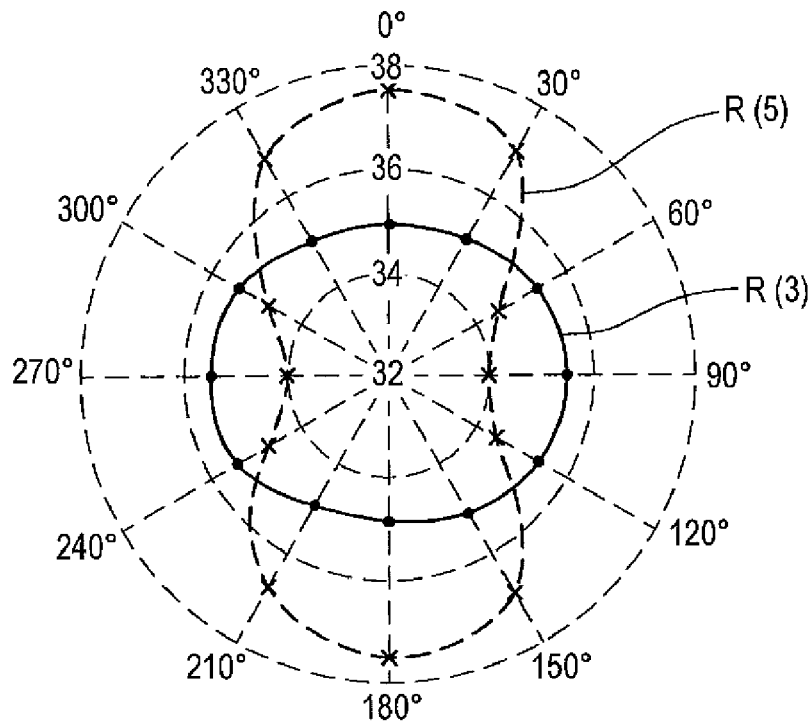
FIG. 12 is a graph for showing a retardation distribution characteristic with respect to the comparison sample.

FIG. 12 graphically represents the values of the retardation "dΔn" in the conoscope type graph, which are indicated by the retardation compensation layers of the comparison samples (3) and (5) indicated in the table 2 and lengths of radiuses correspond to the values of the retardation "dΔn". A retardation distribution characteristic R(3) of the retardation compensation layer formed on the substrate 7c located at the center position along the height direction of the drum 6 does not have an extreme deviation depending upon the azimuth angle with respect to the incident light of the angle of 30 degrees. As apparently seen from the graph, a retardation distribution characteristic R(5) of the retardation compensation layer formed on the substrate 7e is largely changed, depending upon the azimuth angle, and indicates such a rotational symmetrical pattern of 180 degrees as to the azimuth angle. The retardation compensation layer (comparison sample (1)) of the substrate 7a of the first stage has the substantially same trend as that of the comparison sample (5). Although graphic representations as to retardation values of the comparison samples (2) and (4) are omitted, these comparison samples (2) and (4) represent substantially similar characteristics to that of the comparison sample (3) as indicated in the table 2.

Figure 7:
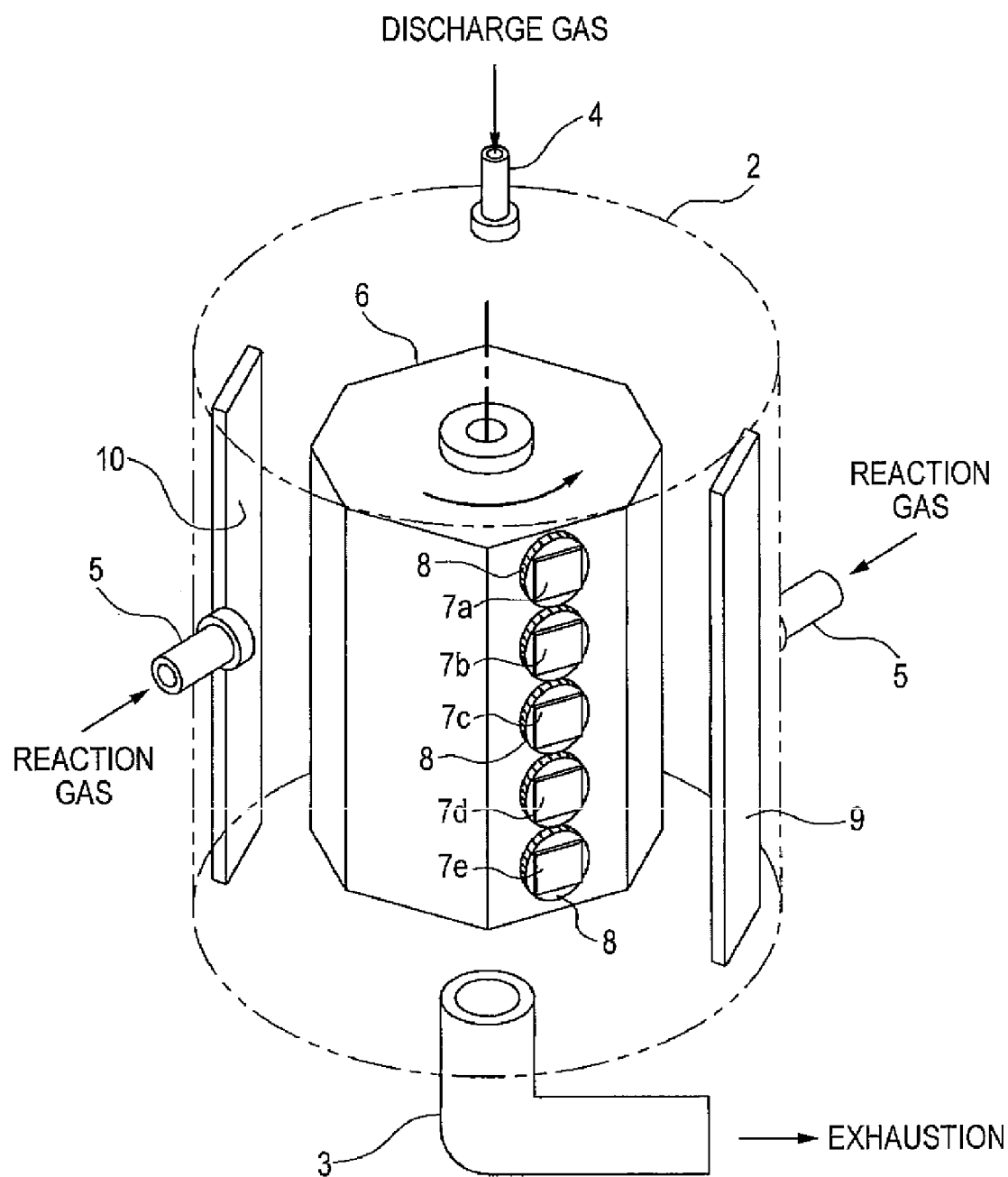
FIG. 7 is a diagram for schematically showing a sputtering apparatus used in an exemplary embodiment of the present invention.

As can been understood from the above-described test results, when the layer forming operations are carried out by employing the sputtering apparatus shown in FIG. 7, strictly speaking, the layer forming conditions established when the thin layers are deposited on the substrates 7a to 7e are not uniform. These layer forming conditions are known from the dimensions and the positions of the target materials 9 and 10, fluctuations contained in oxygen gas concentration, depending upon the positions of the conducting nozzles 5 and 5 for conducting the oxygen gas, and the like. In such a case that the substrates 7a to 7e are fixed on the drum 6 and the retardation compensation layers 21 are merely stacked on these fixed substrates 7a to 7e so as to manufacture such a retardation compensation element as explained in the usual technique, the retardation compensation layers 21 formed on the substrates 7b, 7c, 7d represent stable characteristics without depending upon the azimuth angles, whereas the retardation compensation layers 21 formed on other substrates 7a and 7e have such a characteristic that the depending properties thereof are increased with respect to the azimuth angles. As a result, there are some possibilities that this retardation compensation element cannot be used, depending upon the use field. Accordingly, it may be concerned that the manufacturing efficiency is lowered.

Figure 13:
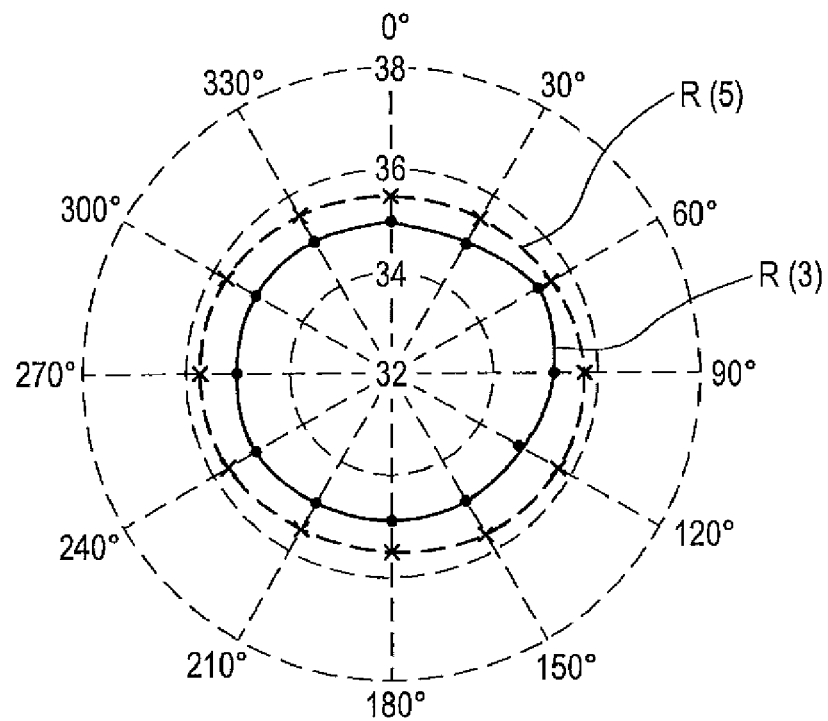
FIG. 13 is a graph for showing a retardation distribution characteristic with respect to the comparison sample, wherein some of reference numerals in the drawings are set forth below.

In contrast to the retardation compensation element, in such a test sample, as represented in FIG. 13, any of the retardation distribution characteristic R(3) of the retardation compensation layer formed on the substrate 7c, and also, the retardation distribution characteristic R(5) of the retardation compensation layer formed on the substrate 7e is not largely changed, depending upon the azimuth angle. That is to say, as to the test sample, at the time instant when the first half layer 21a defined from the first layer up to the 86th layer located on the substrate side is formed in the retardation compensation layer 21, the substrate is rotated at the angle of 90 degrees, and subsequently, the second half layer 21b defined from the 87th layer up to the 172nd layer is formed. Also, as noted in the table 2 as remarks, even when evaluation is made as to maximum values (MAX), minimum values (MIN), difference between the maximum values and the minimum values, averaged values (Average), and standard deviations (σ) of these retardation values with respect to the azimuth angles with respect to the respective test samples and comparison samples, the following fact can be revealed: That is, the test samples can achieve the superior retardation compensation effect having no deviation, as compared with that of the comparison samples.

Although retardation produced when light is vertically entered (incident angle "θ"=0 degree) has no relationship with the azimuth angles, such a difference as represented in the table 3 below can be recognized with respect to comparison samples and test samples. It can be confirmed that among the comparison samples (1) to (5), the retardation compensation layers formed on the substrates 7a and 7e produce retardation values which exceed 1 nm even with respect to the vertically entered light, whereas among the test samples (1) to (5), even any of the retardation compensation layers formed on the substrates 7a to 7e produce only a retardation value smaller than 0.2 nm, and therefore, represent a superior retardation compensation characteristic.

TABLE 3

| | Retardation (nm) when light is vertically entered | |
|---|---|---|
| | Comparison sample | Test sample |
| (1) | 1.83 | −0.06 |
| (2) | 0.24 | −0.07 |
| (3) | −0.22 | −0.04 |
| (4) | 0.21 | −0.14 |
| (5) | 1.74 | −0.04 |

Considering the above-described test results, in accordance with an exemplary embodiment of the present invention, when a retardation compensation layer 21 is formed by employing the sputtering apparatus indicated in FIG. 7, a drum 24 shown in FIG. 1 is utilized instead of the drum 6. The drum 24 is equipped with such a structure that the substrates 7a to 7e are supported from a first stage up to a fifth stage along a longitudinal arranging direction thereof, and furthermore, substrates "7A" to "7E" are supported from the first stage up to the fifth stage along the longitudinal arranging direction, which are located adjacent to the substrate 7a to 7e, while the substrate holder 8 shown in FIG. 7 is no longer required which can be freely rotated.

In a first step for performing a layer forming process, the drum 24 is rotated along an arrow direction in the completely similar manner to the above-described manner, $Nb_2O_5$ layers having physical layer thicknesses of 15 nm as high refractive index layers "L1", and also, SiO$_2$ layers having physical layer thicknesses of 15 nm as low refractive index layers "L2" are alternately stacked on the respective substrates 7a to 7e, and 7A to 7E. At such a time instant when a height of the stacked thin layers becomes equal to a half height of the retardation compensation layer 21, namely up to the first half layer 21a (refer to FIG. 9), the above-described layer forming process is finished. For instance, although the first half layer 21a is formed on the substrate 7E in the above-described manner, a value of retardation which is produced every azimuth angle with respect to light having an incident angle of 30 degrees becomes a half value of the retardation as to the comparison sample (5) in the table 2. As a consequence, a retardation distribution characteristic with respect to the azimuth angle represents a similar trend to (or substantially same as) that of the retardation distribution characteristic R(5) indicated in FIG. 12, and constitutes a rotational symmetrical pattern of 180 degrees as to the azimuth angle.

Similarly, a value of retardation which is caused by the first half layer 21a formed on each of the substrates 7A, 7B, 7C, and 71D with respect to the light having the incident angle of 30 degrees becomes substantially equal to a half value of the retardation measurement value as to each of the comparison samples (1) to (4) of the table 2. Then, when the drum 24 is rotated during the layer forming operation, the substrates 7a, 7b, 7c, 7d, and 7e go around the same rotation trajectories as those of the substrates 7A, 7B, 7C, 7D, and 7E, which are located adjacent to these substrates 7a, 7b, 7c, 7d, and 7e along the lateral direction. Accordingly, the first half layers 21a are formed under the same layer forming condition on each pair of the substrate 7A and the substrate 7a; the substrate 7B and the substrate 7b; the substrate 7C and the substrate 7c; the substrate 7D and the substrate 7d; and the substrate 7E and the substrate 7e. Also, retardation distribution characteristics of these first half layers 21a become identical to each other.

After the first step is finished in the above-described manner, the vacuum chamber 2 is leaked to the atmospheric pressure so as to take out each pair of the substrate 7A and the substrate 7a, the substrate 7B and the substrate 7b, the substrate 7C and the substrate 7c, the substrate 7D and the substrate 7d, and also, the substrate 7E and the substrate 7e, from the vacuum chamber 2, and then, the layer forming process is advanced to a second step. In the second step, the substrates 7A to 7E and 7a to 7e are supported on the drum 24 along a lateral direction, and each of the substrate 7A and the substrate 7a, the substrate 7B and the substrate 7b, the substrate 7C and the substrate 7c, the substrate 7D and the substrate 7d, the substrate 7E and the substrate 7e, on which the first half layers 21a are formed under the same condition, are joined with each other as one pair of a first element and a second element, to be integrated with each other.

Figure 2:
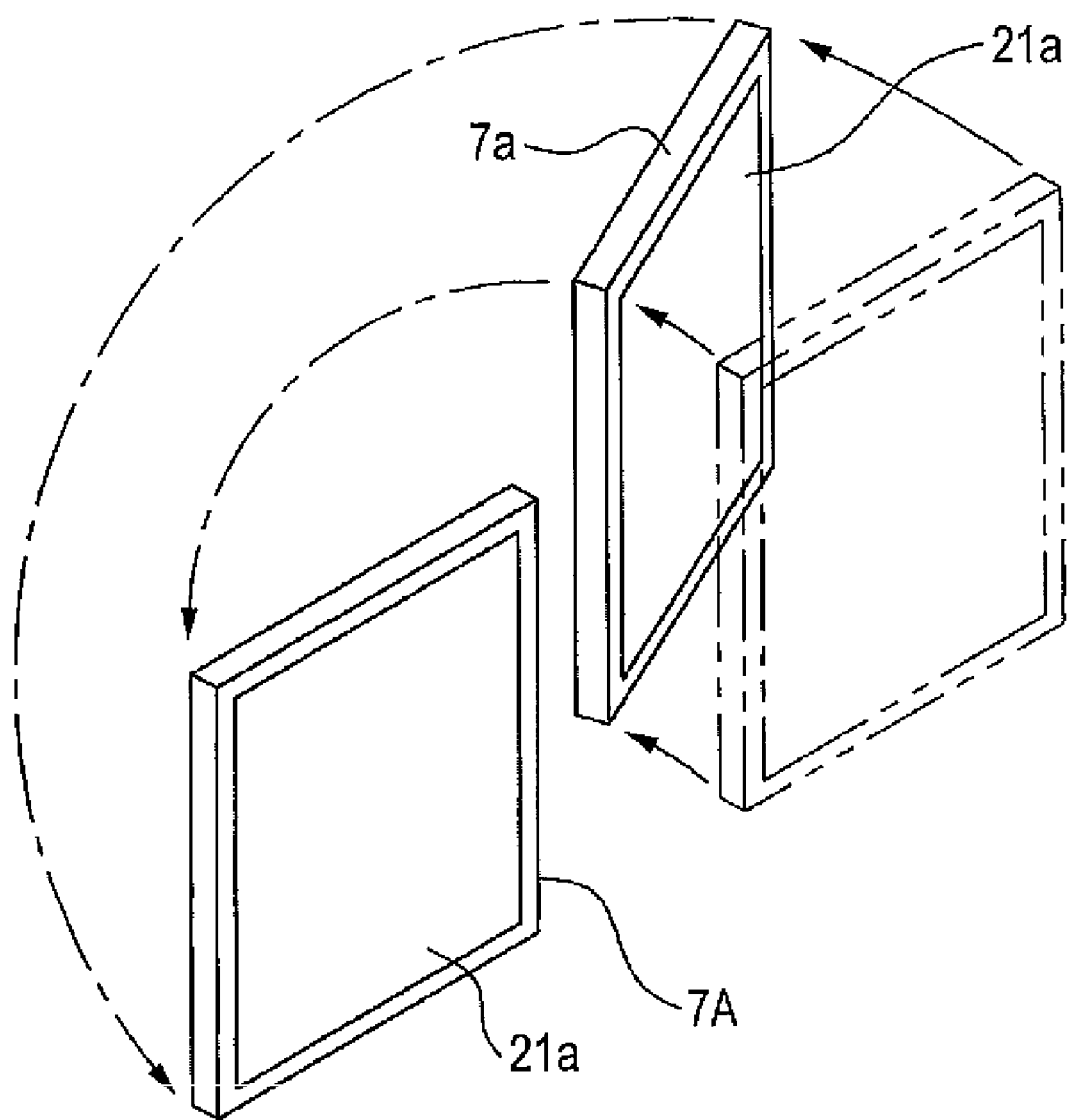
FIG. 2 is an explanatory diagram for explaining a process operation when one pair of substrates is integrated with each other.

At this time, as exemplified in FIG. 2, under such a condition that one substrate 7A is rotated by an angle of 90 degrees with respect to the other substrate 7a, the rear surfaces of the respective substrates 7A and 7a on which the thin layers are not formed are joined with each other. In order to join the substrate 7A to the substrate 7a, transparent adhesive agents may be employed, for instance, either epoxy-series adhesive agents or acrylic-series adhesive agents may be employed, which have superior heat resisting properties and are used so as to join glass substrates, or glass lenses to each other. It is preferably to employ such transparent adhesive agents which have the substantially same refractive indices as those of the substrates, and which do not substantially have birefringent characteristics.

Figure 3:
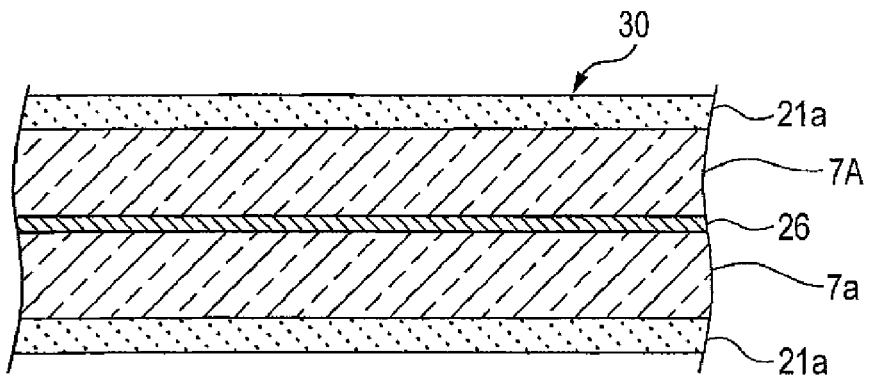
FIG. 3 is a sectional view for schematically indicating two examples of a retardation compensation element according to an embodiment of the present invention.
Figure 3:
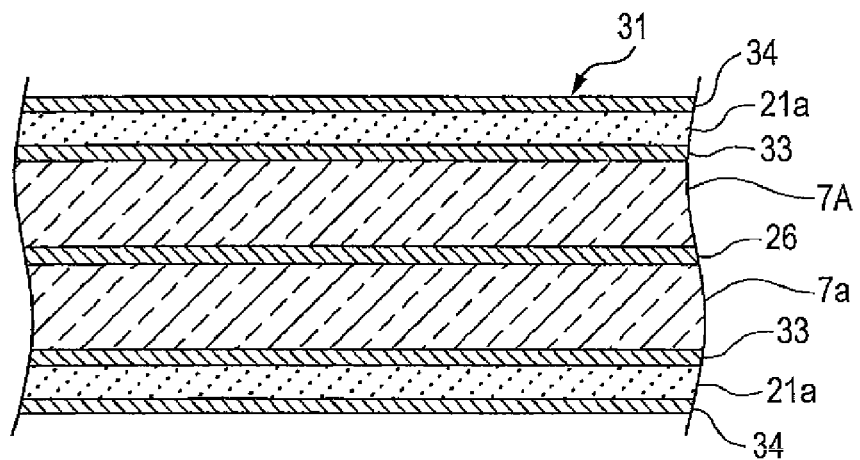

As shown in FIG. 3(A), a retardation compensation element 30 manufactured in the above-explained manner has a multilayer structure of the substrate 7A and the substrate 7a which are joined with each other by an adhesive agent, and the first half layers 21a formed on the surfaces of the respective substrates 7A and 7b. A total layer thickness of the two first half layers 21a formed on the respective substrates 7A and 7a becomes equal to a layer thickness of the retardation compensation layer 21. As a result, these two first half layers 21a may be operated as a "negative retarder" equivalent to the retardation compensation element 21 with respect to light entering this retardation compensation element 30. Moreover, although the respective first half layers 21a have the completely identical retardation distribution characteristics, these first half layers 21a have such a relationship that the retardation distribution characteristics are rotated by an angle of 90 degrees with respect to the azimuth angle. As a consequence, this retardation compensation element 30 eventually has a retardation distribution characteristic equivalent to the characteristic R(5) shown in FIG. 13, so that a superior retardation compensation effect can be achieved, not depending upon the azimuth angle.

FIG. 3(B) indicates another exemplification as to a retardation compensation element 31 manufactured by that antireflection layers 33 and 34 have been provided at proper positions in the retardation compensation element 30 shown in FIG. 3(A). The antireflection layer 33 prevents reflections occurred on boundary planes between each of the substrates 7A and 7a, and the respective first half layers 21a, whereas the antireflection layer 34 prevents reflections occurred on a boundary plane between the first half layer 21a and air. Since these antireflection layers 33 and 34 can be constructed as general-purpose optical interference thin layers formed by stacking approximately 2 to 6 layers of Nb$_2$O$_5$ layers and SiO$_2$ layers, the antireflection layers 33 and 34 may be alternatively manufactured during the above-described first step.

Figure 4:
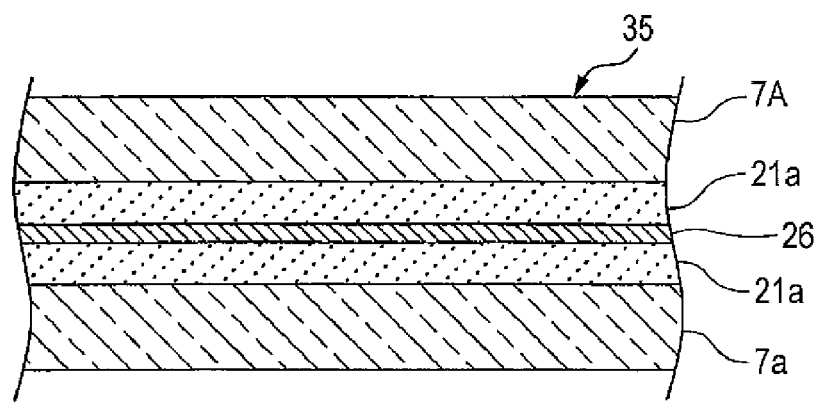
FIG. 4 is a sectional view for schematically showing a retardation compensation element according to another exemplary embodiment of the present invention.

FIG. 4 shows another retardation compensation element 35 in which the first element and the second element manufactured in the above-described first step are joined with each other on the side of the first half layers 21a. Since the respective first half layers 21a are located on the inner side and the substrates 7A and 7a are exposed to the outer side, this retardation compensation element 35 has such an advantage that the first half layers 21a can be protected in order to increase the heat resisting properties. As apparent from the foregoing description, an antireflection layer may be alternatively provided on each of boundary planes between the substrates 7A, 7a, and the respective first half layers 21a, and furthermore, other antireflection layers may be alternatively provided on the first planes of the substrates 7A and 7a.

On the other hand, an important technical point of the second step is that the substrate 7a is rotated by the angle of 90 degrees with respect to the substrate 7A, and thereafter, the substrate 7a is integrated with the substrate 7A. Assuming that the substrate 7a is integrated with the substrate 7A without rotating the substrate 7a by the angle of 90 degrees, such a retardation similar to that of the comparison sample (1) indicated in the table 2 may occur, and thus, an occurrence distribution characteristic of the retardation with respect to the azimuth angle becomes equivalent to the characteristic line R(5) shown in FIG. 12. In addition, such substrates integrated with each other should be selected from the substrates located adjacent to each other on the drum 4 along the lateral direction. As a consequence, in particular, in the case that substrates having regular square shapes are employed, when the substrates 7A to 7E and the substrates 7a to 7e are taken out from the vacuum chamber 2 after the first step are finished, attitudes of the respective substrates 7A to 7E and 7a to 7e should be strictly managed which cannot be completely discriminated from each other in view of outer appearances of these square-shaped substrates. In order to eliminate such a cumbersome work, for example, as indicated in FIG. 5, it is preferable that marks have been previously made on the respective substrates.

Figure 5:
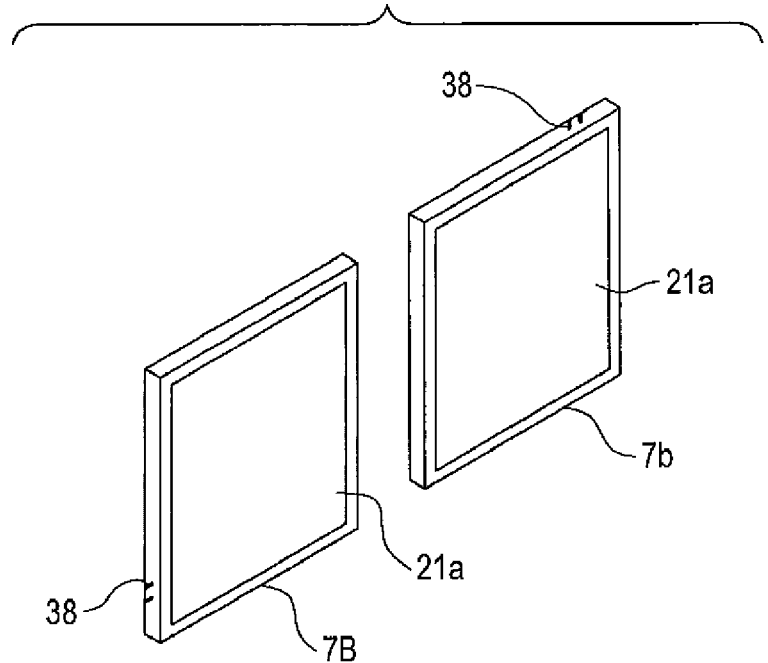
FIG. 5 is an explanatory diagram for explaining an example as to substrates suitable for an exemplary embodiment of the present invention.

The substrates 7B and 7b indicated in FIG. 5 represent such substrates held at the second stage from the top of the drum 24 shown in FIG. 1. Marks 38 each made of two lines for indicating that these substrates 7B and 7b are used in the second stage are previously marked on the side of the rear planes of the substrates 7B and 7b, and these substrates 78 and 7b are set on the drum 24 under such a condition that one substrate is rotated by the angle of 90 degrees with respect to the other substrate. As apparent from the foregoing description, marks made of corresponding numbers are previously made on substrates set at relevant stages. If such marks 38 are utilized, substrates taken from the vacuum chamber 2 via the first step are joined with each other in such a way that the marks 38 are overlapped with each other, so that one pair of the proper substrates can be joined with each other properly. Although the substrates are not always made in the regular square shapes, it is desirable that marks for indicating that the relevant substrates are set to which stage of the drum 24 is previously marked thereon.

Figure 6:
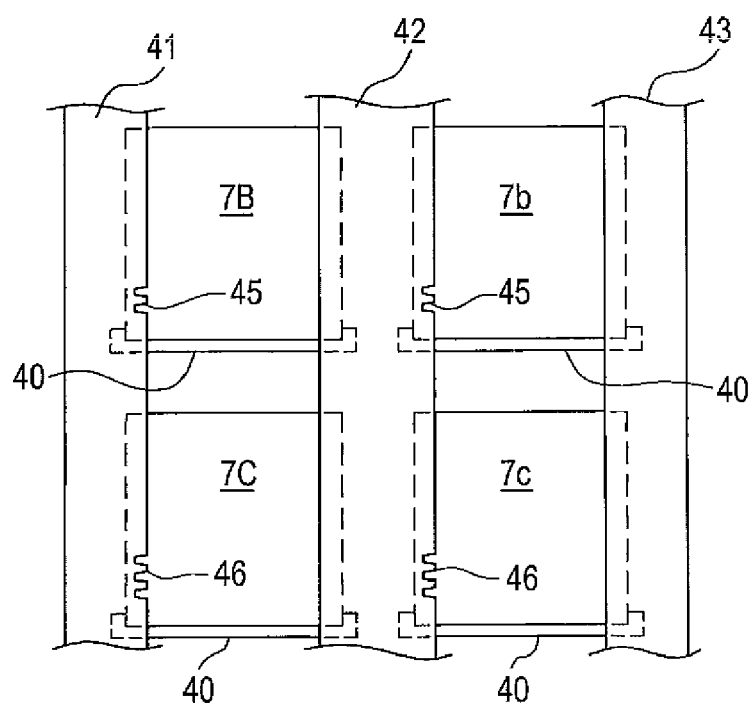
FIG. 6 is an explanatory diagram for explaining such an example that marks are put on substrates when a layer forming process is carried out.

In order to confirm that one pair of substrates after a layer forming process was carried out are correctly combined with each other, or when these correctly combined substrates were joined with each other, these substrates are rotated by the angle of 90 degrees, marks may be alternatively made on the respective substrates at the same time when the layer forming process is performed so as to utilize these marks. FIG. 6 illustratively shows supporting frames 40 fixed on a drum, and the substrates 7B and 7b of the second stage and the substrates 7C and 7c of the third stage, which are held by side plates 41, 42, 43, as viewed from the front plane side Thereof. The side plates 41, 42, 43 have effects that the side plates 41, 42, 43 may suppress the front planes of the substrates 7B, 7b, 7C, 7c by covering right and left edges of the respective substrates 7B, 7b, 7C, 7c in order that the respective substrates 7B, 7b, 7C, 7c do not fall down to the front sides thereof. In addition, these side plates 41, 42, 43 may have an effect of a coat mask for defining layer forming areas on retardation compensation layers on the substrates 7B, 7b, 7C, and 7c.

As indicated in this figure, notches 45 and 46 are formed in the side plates 41 and 42 in correspondence with positions related to the substrates 7B and 7b of the second stage, and the substrates 7C and 7c of the third stage. As a result, two pieces of recess portions are formed on left edges of retardation compensation layers formed on the substrates 7B and 7b of the second stage, whereas three pieces of recess portions are formed on left edges of retardation compensation layers formed on the substrates 7C and 7c of the third stage. Since these recess portions can be readily discriminated from each other by observing reflections of the front planes of the respective retardation compensation layers, these recess portions are utilized as the marks and one pair of such substrates combined with each other can be selected, and it is possible to accurately identify whether or not the selected substrates are rotated by the angle of 90 degrees when the selected substrates are joined with each other. As apparent from the foregoing descriptions, individual side plates may be alternatively employed every substrates of each of the stages, and furthermore, instead of the above-described technical idea that the individual side plates cover the right and left edges of the substrates, the same function may be alternatively given to the coat masks which cover the upper/lower edges of the substrates.

As previously described, in accordance with a retardation compensation element according to an exemplary embodiment of the present invention, it is so assumed that when the individual thin layers are formed, in conjunction with the fluctuations contained in the slight layer forming conditions which cannot he strictly controlled, the deviations of the physical properties such as the layer thicknesses and the birefringent indices are gradually accumulated, and the physical properties are finally deviated which cannot be neglected. Under such an assumption, one pair of substrates on which thin layers are commonly formed, the height of which is equal to a half height of a retardation compensation layer are processed in the below-mentioned manner: That is, one substrate of the paired substrates is rotated by an angle of 90 degrees, and the rotated one substrate is integrated with the other substrate in order that the deviations of the physical properties are corrected in the complementary manner, so that the entire physical property of the retardation compensation layer can be maintained under better conditions in a total manner. The above-described manufacturing method can have such a practical value that this manufacturing method can be applied even when a slight difference in the layer forming conditions and a change in physical property values caused by this slight layer forming condition are not grasped in a quantitative manner. Thus, this manufacturing method may be applied to various layer forming methods such as not only a general-purpose sputtering method, but also a vapor deposition method and an ion plating method.

Also, in the case that an inventive ideas of the present invention are embodied, not only such a retardation compensation layer formed by alternately stacking two types of thin layers may be employed whose refractive indices are different from each other, but also another retardation compensation layer formed by stacking three or more thin layers may be alternatively employed. The refractive indices and the layer thicknesses of the individual thin layers which constitute the retardation compensation layers, and furthermore, total stacking layer numbers thereof may be properly set in response to kinds of liquid crystal layers which are employed so as to be combined with these retardation compensation layers. Practically speaking, it is desirable to provide properly selected numbers of antireflection layers on boundary planes among the substrates, the retardation compensation layers, and air. Alternatively, exclusively-used thin layer materials which are not utilized in the retardation compensation layers may be employed in at least a portion of the thin layers which constitute the antireflection layers, while the exclusively-used thin layer materials are known from, for example, an $MgF_2$ layer which is employed as a low refractive index material in a stable manner. As apparent from the foregoing descriptions, if only the retardation compensation effect is to achieve the purpose of the present invention, then these antireflection layers may be alternatively omitted.

What is claimed is:

1. A method for manufacturing a retardation compensation element capable of generating negative retardation in light passing the retardation compensation element the method comprising:

providing a plurality of transparent substrates and at least two materials in a vacuum chamber;

depositing particles released from the at least two materials onto the plurality of transparent substrates to form a retardation compensation layer having a multilayer structure in which at least two types of thin layers that have different refractive indices from each other are alternately stacked on each of the transparent substrates, wherein the plurality of transparent substrates include a pair of substrates on each of which the retardation compensation layer having a substantially same thickness is formed; and taking out the pair of substrates from the vacuum chamber and joining the pair of substrates with each other so that retardation distribution characteristics for azimuth angles of light incident on the respective substrates are rotated at substantially 90 degrees relative to each other.

2. The method according to claim 1, wherein in the joining of the pair of substrates, the pair of substrates are joined with each other on surfaces thereof not having the multilayer structure.

3. The method according to claim 1, wherein in the joining of the pair of substrates, the pair of substrates are joined with each other on surface-sides of respective multilayer structures.

4. The method according to claim 1, wherein in the depositing of particles, the pair of substrates are supported on a drum rotated within the vacuum chamber and go around a same trajectory by rotating the drum.

* * * * *